United States Patent [19]

Fujinami et al.

[11] Patent Number: 5,572,380
[45] Date of Patent: Nov. 5, 1996

[54] DISC PLAYBACK APPARATUS WITH AUTOMATIC DISC CHANGER

[75] Inventors: Yasushi Fujinami, Kanagawa; Kiyoshi Ohsato, Chiba, both of Japan

[73] Assignee: Sony Corporation, Japan

[21] Appl. No.: 906,268

[22] Filed: Jun. 26, 1992

[30] Foreign Application Priority Data

Jul. 5, 1991 [JP] Japan .................................. 3-190930

[51] Int. Cl.$^6$ ............................................. G11B 19/26
[52] U.S. Cl. .......................................... 360/73.03; 369/54
[58] Field of Search ................... 369/50, 54; 360/73.03

[56] References Cited

U.S. PATENT DOCUMENTS

| | | | |
|---|---|---|---|
| 4,860,272 | 8/1989 | Nishikawa et al. | 360/78.04 X |
| 4,872,073 | 10/1989 | Fincher et al. | 360/51 |
| 4,922,476 | 5/1990 | Kiyoura et al. | 369/32 X |
| 5,224,089 | 6/1993 | Matsumura et al. | 360/73.03 |

FOREIGN PATENT DOCUMENTS 0485020  5/1992  European Pat. Off. .

Primary Examiner—Aristotelis Psitos
Assistant Examiner—James T. Wilson
Attorney, Agent, or Firm—Limbach & Limbach LLP

[57] ABSTRACT

A disc playback apparatus has an automatics disc changer for selecting one of a plurality of information storage discs at a time. The disc selected by the automatic disc changer is rotated on a turntable by a spindle motor. While the disc is rotating, information contained in the disc is reproduced by a pickup, which transfers the reproduced information to a buffer memory. The information stored in the buffer memory is transferred to and processed by a decoder which decodes and sends the information to a display. The disc playback apparatus includes a controller for monitoring the amount of information stored in the buffer memory and controlling the rotational speed of the disc depending on the amount of information stored in the buffer memory. The rotational speed of the disc is controlled to cause the pickup to transfer the reproduced information to the buffer memory at a maximum rate before the buffer memory becomes full of stored information. When the buffer memory is full of stored information, the rotational speed is controlled to cause the pickup to transfer the reproduced information to the buffer memory at a constant rate lower than the maximum rate. The constant rate is equal to a rate at which the stored information is transferred from the buffer memory to the decoder.

4 Claims, 3 Drawing Sheets

DISC PLAYBACK APPARATUS WITH AUTOMATIC DISC CHANGER

BACKGROUND OF THE INVENTION

1. Field of the Invention

The present invention relates to a disc playback apparatus with an automatic disc changer for selecting a desired one of a plurality of information storage discs and reproducing stored information from the selected disc.

2. Description of the Prior Art

Some disc playback apparatus for playing back pre-recorded musical accompaniments, so-called "karaoke" music, store a plurality of discs from which a desired disc can be selected by the user and played back for reproducing a desired musical accompaniment. After the disc has been played back, another disc containing a desired musical accompaniment is selected by the user to replace the disc that has been played back. Upon completion of the disc replacement, the new disc is played back to reproduce the selected musical accompaniment. Therefore, the user can successively sing songs to selected musical accompaniments simply by indicating those musical accompaniments which he wants to get reproduced. Usually, musical accompaniments are accompanied by video images that are reproduced on displays.

While discs are being changed, or the previously played-back disc is being replaced with a new disc, no music is played back for a certain period of time, e.g., at least 10 seconds.

OBJECTS AND SUMMARY OF THE INVENTION

In view of the aforesaid shortcoming of the conventional disc playback apparatus, it is an object of the present invention to provide a disc playback apparatus with an automatic disc changer, which is capable of reproducing stored information when desired ones of a plurality of discs are being successively selected and played back.

According to the present invention, there is provided a disc playback apparatus comprising selecting means for selecting one of a plurality of information storage discs at a time, rotating means for rotating the disc selected by the selecting means at a rotational speed, pickup means for reproducing information from the disc rotated by the rotating means, memory means for temporarily storing the information reproduced by the reproducing means, processing means for reading and processing the information stored by the memory means, and control means for monitoring the amount of information stored in the memory means and controlling the rotational speed at which the disc is rotated by the rotating means, depending on the amount of information stored in the memory means.

The control means controls the rotational speed to cause the pickup means to transfer the reproduced information to the memory means at a maximum rate before the memory means becomes full of stored information, and also controls the rotational speed to cause the pickup means to transfer the reproduced information to the memory means at a constant rate lower than the maximum rate when the memory means is full of stored information. The constant rate is equal to a rate at which the stored information is transferred from the memory means to the processing means.

Therefore, the memory means stores a certain amount of information at all times. When discs are changed by the selecting means, the remaining amount of information stored in the memory means is transferred to the processing means. Therefore, the reproduced information is prevented from being interrupted during disc replacement.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
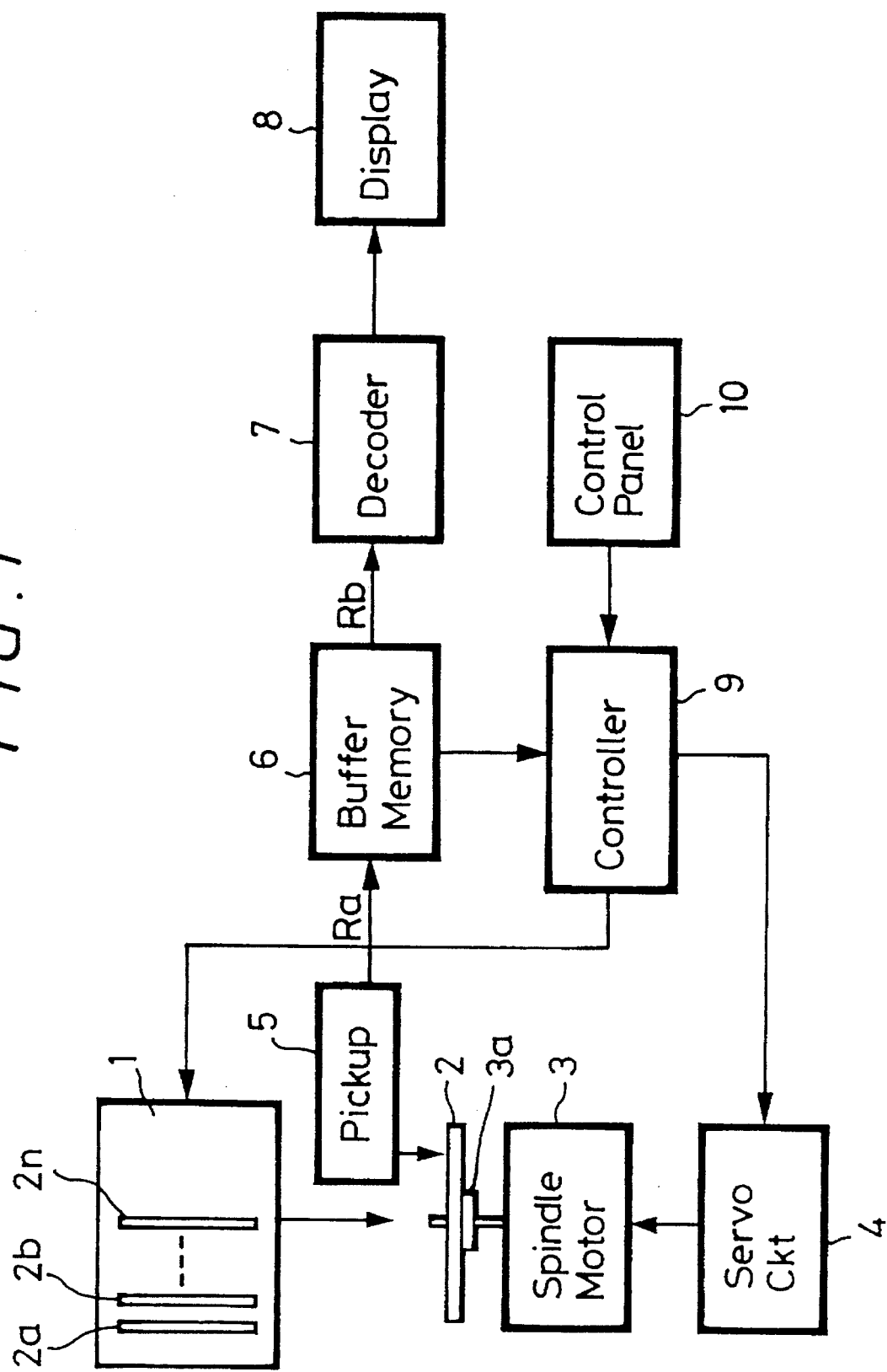
FIG. 1 is a block diagram of a disc playback apparatus according to the present invention; of the disc playback apparatus shown in FIG. 1.

FIG. 1 shows a disc playback apparatus according to the present invention. The disc playback apparatus is particularly useful when employed to play back pre-recorded musical accompaniments, so-called "karaoke" music, in combination with respective pieces of video image information.

As shown in FIG. 1, the disc playback apparatus includes an automatic disc changer 1 for storing a plurality of discs 2a, 2b, . . . , 2n. The automatic disc changer 1 selects a desired one 2 of the stored discs according to the user's demand, and places the selected disc 2 on a turntable 3a which can be rotated by a spindle motor 3. The disc playback apparatus also includes a pickup 5 for reproducing information recorded on the disc 2 which is being rotated by the turntable 3a, and supplying the reproduced information to a buffer memory 6. The buffer memory 6 comprises a FIFO memory which supplies stored information to a decoder 7 on a first-in, first-out basis. The decoder 7 supplies decoded information to a display 8 for display.

The disc playback apparatus includes a controller 9 for controlling the automatic disc changer 1 in response to the user's command sent from a control panel 10 and also for controlling a servo circuit 4 in response to an output signal from the buffer memory 6. The servo circuit 4 controls the rotation of the spindle motor 3.

Figure 2:
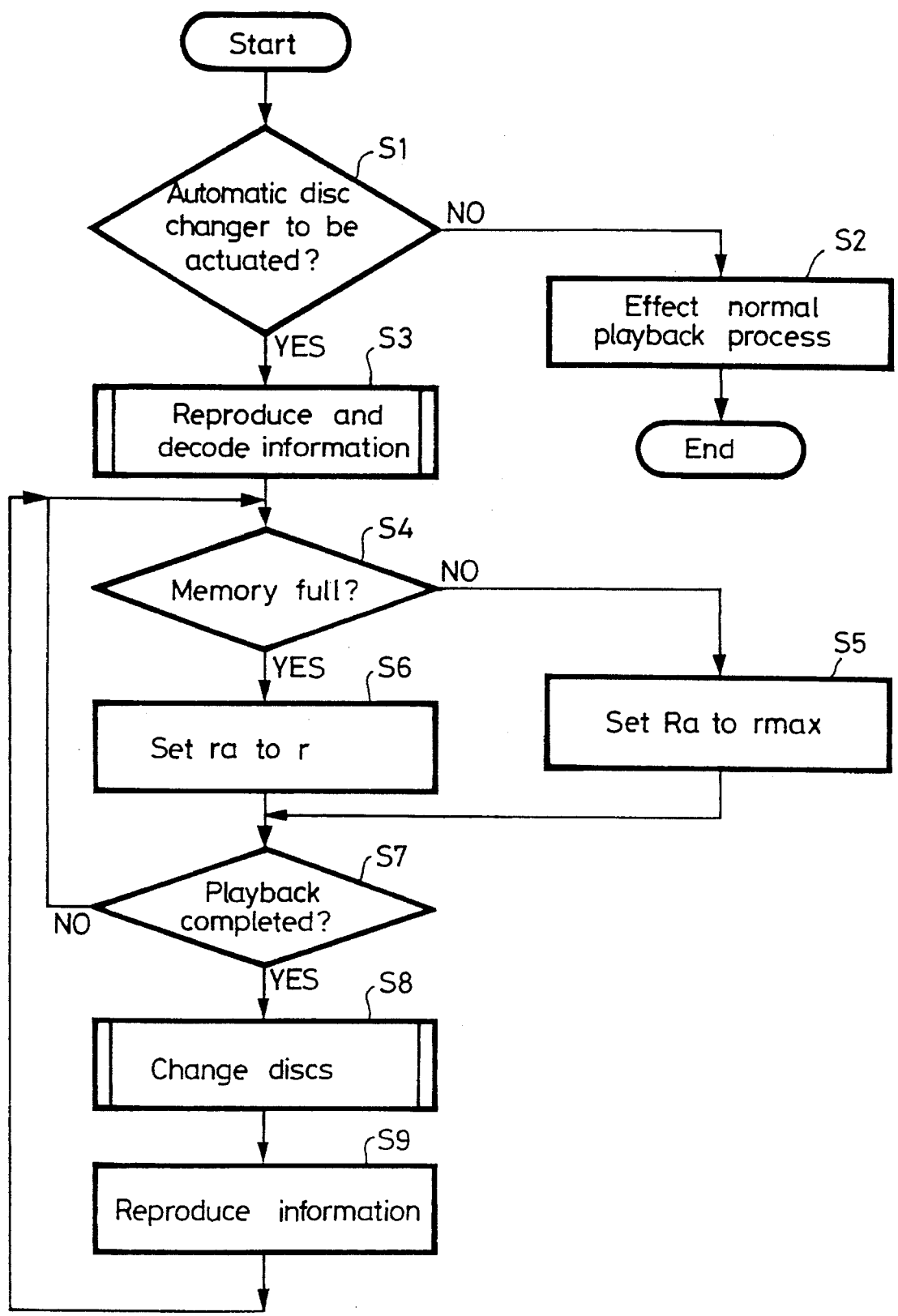
FIG. 2 is a flowchart of an operation sequence

Operation of the disc playback apparatus will be described below with reference to FIG. 2. When the user operates on the control panel 10 to instruct the disc playback apparatus to start reproducing recorded information, the controller 9 determines whether the automatic disc changer 1 is to be actuated or not in a step S1. For example, if the user wants to reproduce only one music piece recorded in a certain disc, there is no need to change discs, and hence the automatic disc changer 1 is not actuated. Therefore, since it is not necessary to actuate the automatic disc changer 1, control goes from the step S1 to a step S2 which effects a normal playback process.

If, however, the user operates on the control panel 10 to instruct the disc playback apparatus to successively play back a music piece recorded in the disc 2a, a music piece recorded in the disc 2b, and a music piece recorded in the disc 2c, then it is necessary to change these discs automatically. Therefore, the automatic disc changer 1 needs to be actuated, control proceeds from the step S1 to a step S3 which starts playing back the first music piece.

More specifically, the controller 9 outputs a control signal to the automatic disc changer 1 to enable the latter to select the disc 2a, for example, and place the disc 2a on the turntable 3a. The controller 9 also controls the servo circuit 4 to energize the spindle motor 3. At this time, no information is stored in the buffer memory 6. Consequently, the controller 9 rotates the disc 2 on the turntable 3aat a maximum speed. The pickup 5 reproduces information recorded in the disc 2, and supplies the reproduced information to the buffer memory 6. As the disc 2 is rotating at the maximum speed, the reproduced information is transferred from the disc 2 to the buffer memory 6 at a transfer rate Ra which is of a maximum value(see FIG. 3). Because the buffer memory 6 is of an FIFO configuration, the stored information in the buffer memory 6 is then supplied to the decoder 7 such that it is extracted from the memory in the same order that it is entered. The decoder 7 decodes the supplied information, i.e., de-interleaves the information, detects and corrects errors contained in the information, and then supplies the decoded information to the display 8. The display 8 displays video images contained in the supplied information. At the same time, the decoded information is supplied to an audio reproducing system for playing back a music piece contained in the supplied information.

The information is transferred from the buffer memory 6 to the decoder 7 at a transfer rate Rb of a constant value (see FIG. 3) that is lower than the transfer rate Ra at which the information is transferred from the pickup 5 to the buffer memory 6. Therefore, the buffer memory 6 gradually accumulates an amount of information corresponding to the difference between the transfer rates Ra, Rb.

In a step S4, the controller 9 monitors the amount of information stored in the buffer memory 6, and determines whether the buffer memory 6 is full of stored information. If not full, then control goes to a step S5 in which the transfer rate, or playback bit rate, Ra is set to a maximum value. Therefore, the controller 9 controls the servo circuit 4 to cause the spindle motor 3 to rotate the disc 2 at the maximum speed. If the buffer memory 6 is full of stored information, then control proceeds to a step S6 in which the playback bit rate Ra is set to a normal value which is the same as the constant value of the transfer rate Rb. That is, the controller 9 controls the servo circuit 4 to cause the spindle motor 3 to rotate the disc 2 at a standard speed.

After the steps S5, S6, the controller 6 determines whether the playback of the disc 2a is completed or not in a step S6. If not completed, then control returns to the step S4, and repeats the steps S4, S5, S6, S7. If completed, then goes to a step S8 in which the automatic disc changer 1 is actuated. More specifically, the controller 9 controls the servo circuit 4 to de-energize the spindle motor 3, and also controls the automatic disc changer 1 to remove the disc 2a from the turntable 3a, return the disc 2a back to its storage location, retrieves the disc 2b, for example, to be played back next, and places the disc 2b on the turntable 3a.

After the disc 2a has been replaced with the disc 2b, the disc 2b starts being played back in a step S9. In the step S9, the controller 9 controls the servo circuit 4 to energize the spindle motor 3 to rotate the disc 2 on the turntable 3a. The pickup 5 reproduces information recorded in the disc 2, and transfers the information to the buffer memory 6. Control goes back from the step S9 to the step S4, and repeats the steps S4 through S7.

Figure 3:
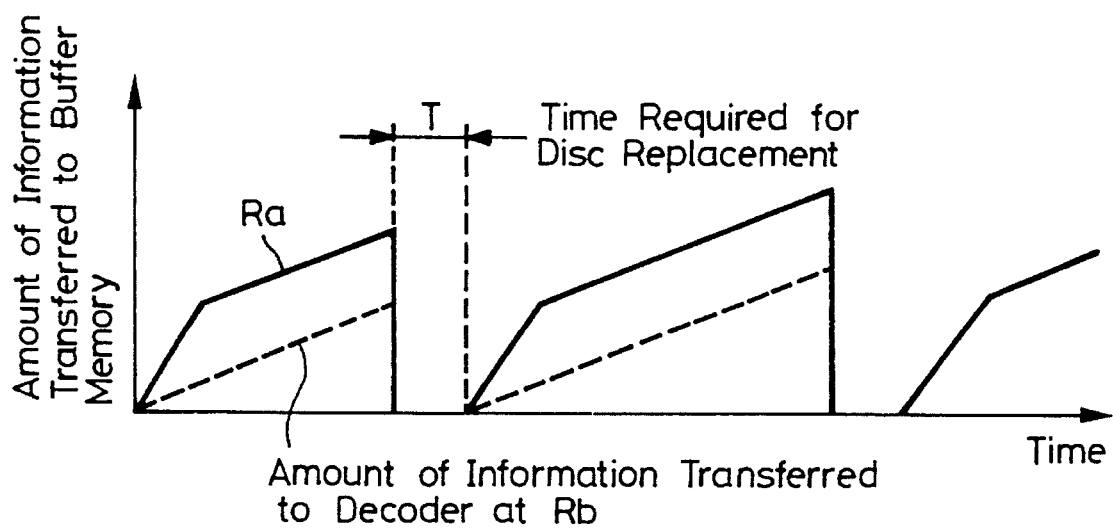
FIG. 3 is a graph showing the manner in which the amount of information supplied to a buffer memory in the disc playback apparatus varies with time.

Supply of information to and from the buffer memory 6 will be described below with reference to FIGS. 3 and 4.

Immediately after a disc starts being played back, no information is stored in the buffer memory 6, and therefore reproduced information is transferred from the pickup 5 to the buffer memory 6 at a maximum transfer rate. Since the decoder 7 requires information at a constant rate, the information stored in the buffer memory 6 is read therefrom and supplied to the decoder 7 at a constant bit rate. Inasmuch as the transfer rate, or bit rate, at which the information enters the buffer memory 6 is higher than the transfer rate, or bit rate, at which it is extracted from the buffer memory 6, the amount of information corresponding to the difference between the transfer rates is gradually accumulated in the buffer memory 6 until the buffer memory 6 becomes full of stored information. When the buffer memory 6 is full of stored information, the transfer rate at which the information enters the buffer memory 6 is made equal to the transfer rate at which it is extracted from the buffer memory 6. When the playback of one music piece stored in a disc is finished, the amount of information which is transferred from the pickup 5 to the buffer memory 6 becomes zero. As shown in FIG. 3, no information is transferred from the pickup 5 to the buffer memory 6 for a period of time T in which discs are changed by the automatic disc changer 1, i.e., until a desired music piece stored in another disc begins to be played back.

Figure 4:
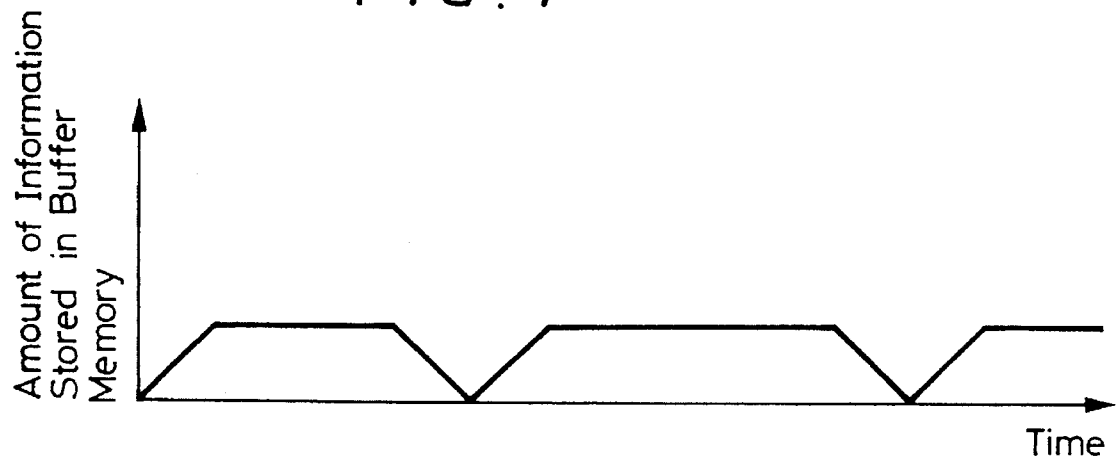
FIG. 4 is a graph showing the manner in which the amount of information stored in the buffer memory varies with time.

As shown in FIG. 4, the amount of information stored in the buffer memory 6 is gradually increased immediately after a music piece starts being played back, and then remains at a constant level when the buffer memory 6 becomes full. While the disc is being replaced with another disc, no information is transferred from the pickup 5 to the buffer memory 6. Therefore, the buffer memory 6 supplies the information which is still stored therein to the decoder 7 at the bit rate Rb. The storage capacity of the buffer memory 6 is determined by the product of the maximum period of time required for disc replacement and the maximum bit rate to which the information is transferred from the buffer memory 6 to the decoder 7. For example, if the maximum bit rate to which the information is transferred from the buffer memory 6 to the decoder 7 is 20 Mbps and the maximum period of time required for disc replacement is 15 seconds, then the storage capacity of the buffer memory 6 is 300 Mbits (20×15).

As described above, the rotational speed of the disc is controlled depending on the amount of information stored in the buffer memory 6. Even while discs are being changed and hence no information is being supplied from the pickup 5, the remaining information stored in the buffer memory 6 can be read for reproduction. Therefore, the reproduced information is prevented from being interrupted during disc replacement.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A disc playback apparatus comprising:

selecting means for selecting one of a plurality of information storage discs at a time for playback;

rotating means for rotating the disc selected by said selecting means at a rotational speed;

pickup means for reproducing information from the disc being rotated by said rotating means;

memory means for temporarily storing the information reproduced by said pickup means;

processing means for reading and processing the information stored by said memory means; and control means for monitoring the amount of information stored in said memory means and controlling the rotational speed at which the disc is rotated by said rotating means, depending on the amount of information stored in said memory means thereby avoiding interruption in reading of information from the memory means, which would otherwise result from interrupted flow to the memory means of information reproduced by the pickup means during switching between discs selected for playback.

2. A disc playback apparatus according to claim 1 wherein said control means comprises means for controlling said rotational speed to cause said pickup means to transfer the reproduced information to said memory means at an increased rate upon detecting a decreased amount of information stored in the memory means before said memory means becomes full of stored information.

3. A disc playback apparatus according to claim 2, wherein said control means comprises means for controlling said rotational speed to cause said pickup means to transfer the reproduced information to said memory means at a substantially constant rate lower than said increased rate upon detecting that said memory means is full of stored information.

4. A disc playback apparatus according to claim 3, wherein said substantially constant rate is substantially equal to a rate at which the stored information is transferred from said memory means to said processing means.

* * * * *